US006708552B2

(12) United States Patent
Weldon

(10) Patent No.: US 6,708,552 B2
(45) Date of Patent: Mar. 23, 2004

(54) SENSOR ARRANGEMENT FOR AN INTEGRATED PRESSURE MANAGEMENT APPARATUS

(75) Inventor: Craig Weldon, Chatham (CA)

(73) Assignee: Siemens Automotive Inc. (CA)

( * ) Notice: Subject to any disclaimer, the term of this patent is extended or adjusted under 35 U.S.C. 154(b) by 0 days.

(21) Appl. No.: 09/893,508

(22) Filed: Jun. 29, 2001

(65) Prior Publication Data

US 2003/0000288 A1 Jan. 2, 2003

(51) Int. Cl.[7] ................................................ G01M 3/04

(52) U.S. Cl. .......................................... 73/40; 200/81.4

(58) Field of Search ............................... 73/40, 40.5 R, 73/49.7, 118.1; 123/520, 518; 702/51; 200/81.4, 83 R, 83 N

(56) References Cited

U.S. PATENT DOCUMENTS

| | | | | | |
|---|---|---|---|---|---|
| 2,749,536 | A | * | 6/1956 | Sperling | 340/242 |
| 2,766,349 | A | * | 10/1956 | Hamburg | 200/83 |
| 3,110,502 | A | | 11/1963 | Pagano | 277/189 |
| 3,190,322 | A | | 6/1965 | Brown | 141/387 |
| 3,413,840 | A | | 12/1968 | Basile et al. | 73/40 |
| 3,516,279 | A | | 6/1970 | Maziarka | 73/4 |
| 3,586,016 | A | | 6/1971 | Meyn | 137/39 |
| 3,631,389 | A | * | 12/1971 | Elliott | 340/60 |
| 3,640,501 | A | | 2/1972 | Walton | 251/332 |
| 3,720,090 | A | | 3/1973 | Halpert et al. | 73/4 |
| 3,802,267 | A | | 4/1974 | Lofink | 73/279 |
| 3,841,344 | A | | 10/1974 | Slack | 137/88 |
| 3,861,646 | A | | 1/1975 | Douglas | 251/356 |
| 3,884,077 | A | * | 5/1975 | Anthy, Jr. | 73/388 R |
| 3,927,553 | A | | 12/1975 | Frantz | 73/4 |
| 3,962,905 | A | * | 6/1976 | Jouve | 73/40.5 R |
| 4,009,985 | A | | 3/1977 | Hirt | 431/5 |
| 4,136,854 | A | | 1/1979 | Ehmig et al. | 251/333 |
| 4,164,168 | A | | 8/1979 | Tateoka | 91/376 |
| 4,166,485 | A | | 9/1979 | Wokas | 141/52 |
| 4,215,846 | A | | 8/1980 | Ishizuka et al. | 251/298 |
| 4,240,467 | A | | 12/1980 | Blatt et al. | 137/625.66 |
| 4,244,554 | A | | 1/1981 | DiMauro et al. | 251/61.1 |
| 4,255,630 | A | * | 3/1981 | Hire et al. | 200/81.4 |
| 4,354,383 | A | | 10/1982 | Härtel | 73/290 |
| 4,368,366 | A | | 1/1983 | Kitamura et al. | 200/83 |
| 4,474,208 | A | | 10/1984 | Looney | 137/516.29 |

(List continued on next page.)

OTHER PUBLICATIONS

U.S. patent Appln. No. 09/566,138, Paul D. Perry, filed May 5, 2000.

U.S. patent Appln. No. 09/566,137, Paul D. Perry, filed May 5, 2000.

U.S. patent Appln. No. 09/566,136, Paul D. Perry et al., filed May 5, 2000.

(List continued on next page.)

*Primary Examiner*—Helen Kwok
*Assistant Examiner*—Charles Garber

(57) ABSTRACT

A sensor arrangement and a method of verificating leaks in a fuel system including an integrated pressure management apparatus. The sensor arrangement comprises a chamber having an interior volume varying in response to fluid pressure in the chamber, a first switch, and a second switch. The chamber includes a diaphragm that is displaceable between a first configuration in response to fluid pressure above a first pressure level, a second configuration in response to fluid pressure below the first pressure level but above a second pressure level, and a third configuration in response to fluid pressure below the second pressure level. The third pressure level being lower than the second pressure level, and the second pressure level being lower than the first pressure level. The first switch is actuated by the diaphragm in the second configuration. And the second switch is actuated by the diaphragm in the third configuration.

12 Claims, 3 Drawing Sheets

U.S. PATENT DOCUMENTS

| | | | | | |
|---|---|---|---|---|---|
| 4,494,571 | A | | 1/1985 | Seegers et al. | 137/596.16 |
| 4,518,329 | A | | 5/1985 | Weaver | 417/566 |
| 4,561,297 | A | | 12/1985 | Holland | 73/119 |
| 4,593,166 | A | * | 6/1986 | Hirota et al. | 200/83 J |
| 4,616,114 | A | | 10/1986 | Strasser | 200/83 |
| 4,717,117 | A | | 1/1988 | Cook | 251/61.1 |
| 4,766,557 | A | | 8/1988 | Twerdochlib | 702/51 |
| 4,766,927 | A | | 8/1988 | Conatser | 137/315 |
| 4,852,054 | A | | 7/1989 | Mastandrea | 702/51 |
| 4,892,985 | A | * | 1/1990 | Tateishi | 200/83 N |
| 4,901,559 | A | | 2/1990 | Grabner | 73/64.45 |
| 4,905,505 | A | | 3/1990 | Reed | 73/64.46 |
| 4,959,569 | A | * | 9/1990 | Snuttjer et al. | 310/53 |
| 5,036,823 | A | | 8/1991 | MacKinnon | 123/520 |
| 5,069,188 | A | | 12/1991 | Cook | 123/520 |
| 5,090,234 | A | | 2/1992 | Maresca, Jr. et al. | 73/49.1 |
| 5,096,029 | A | | 3/1992 | Bauer et al. | 188/300 |
| 5,101,710 | A | | 4/1992 | Baucom | 454/238 |
| 5,253,629 | A | | 10/1993 | Fornuto et al. | 123/519 |
| 5,259,424 | A | | 11/1993 | Miller et al. | 141/4 |
| 5,263,462 | A | | 11/1993 | Reddy | 123/520 |
| 5,273,071 | A | | 12/1993 | Oberrecht | 137/614.06 |
| 5,327,934 | A | | 7/1994 | Thompson | 137/588 |
| 5,337,262 | A | | 8/1994 | Luthi et al. | 364/580 |
| 5,372,032 | A | | 12/1994 | Filippi et al. | 73/40.5 |
| 5,388,613 | A | | 2/1995 | Krüger | 137/625.34 |
| 5,390,643 | A | | 2/1995 | Sekine | 123/514 |
| 5,390,645 | A | | 2/1995 | Cook et al. | 123/520 |
| 5,415,033 | A | | 5/1995 | Maresca, Jr. et al. | 73/40.5 |
| 5,507,176 | A | | 4/1996 | Kammeraad et al. | 73/49.2 |
| 5,524,662 | A | | 6/1996 | Benjey et al. | 137/43 |
| 5,564,306 | A | | 10/1996 | Miller | 73/861 |
| 5,579,742 | A | | 12/1996 | Yamazaki et al. | 123/520 |
| 5,584,271 | A | | 12/1996 | Sakata | 123/188.6 |
| 5,603,349 | A | | 2/1997 | Harris | 137/588 |
| 5,614,665 | A | | 3/1997 | Curran et al. | 73/118.1 |
| 5,635,630 | A | | 6/1997 | Dawson et al. | 73/40.5 |
| 5,644,072 | A | | 7/1997 | Chirco et al. | 73/49.2 |
| 5,671,718 | A | | 9/1997 | Curran et al. | 123/520 |
| 5,681,151 | A | | 10/1997 | Wood | 417/307 |
| 5,687,633 | A | | 11/1997 | Eady | 92/97 |
| 5,743,169 | A | | 4/1998 | Yamada | 92/100 |
| 5,893,389 | A | | 4/1999 | Cunningham | 137/516.27 |
| 5,894,784 | A | | 4/1999 | Bobbitt, III et al. | 92/100 |
| 5,979,869 | A | | 11/1999 | Hiddessen | 251/285 |
| 6,003,499 | A | | 12/1999 | Devall et al. | 123/520 |
| 6,073,487 | A | | 6/2000 | Dawson | 73/118.1 |
| 6,089,081 | A | | 7/2000 | Cook et al. | 73/118.1 |
| 6,142,062 | A | | 11/2000 | Streitman | 92/99 |
| 6,145,430 | A | | 11/2000 | Able et al. | 92/93 |
| 6,168,168 | B1 | | 1/2001 | Brown | 277/637 |
| 6,202,688 | B1 | | 3/2001 | Khadim | 137/599.08 |
| 6,203,022 | B1 | | 3/2001 | Struschka et al. | 277/572 |
| 6,328,021 | B1 | | 12/2001 | Perry et al. | 123/518 |
| 6,363,921 | B1 | | 4/2002 | Cook et al. | 123/520 |
| 6,460,566 | B1 | * | 10/2002 | Perry et al. | 137/495 |
| 6,536,261 | B1 | | 3/2003 | Weldon et al. | 73/49.7 |

OTHER PUBLICATIONS

U.S. patent appln. No. 09/566,135, Paul D. Perry, filed May 5, 2000.

U.S. patent Appln. No. 09/566,133, Paul D. Perry, filed May 5, 2000.

U.S. patent Appln. No. 09/565,028, Paul D. Perry et al., filed May 5, 2000.

U.S. patent Appln. No. 09/543,749, Paul D. Perry, filed Apr. 5, 2000.

U.S. patent Appln. No. 09/543,742, Paul D. Perry, filed Apr. 5, 2000.

U.S. patent Appln. No. 09/543,741, Paul D. Perry, filed Apr. 5, 2000.

U.S. patent Appln. No. 09/543,740, Paul D. Perry et al., filed Mar. 31, 2000.

U.S. patent Appln. No. 09/542,052, Paul D. Perry et al., filed Mar. 31, 2000.

U.S. patent Appln. No. 09/540,491, Paul D. Perry, filed Mar. 31, 2000.

U.S. patent Appln. No. 09/893,530, Craig Weldon, filed Jun. 29, 2001.

U.S. patent Appln. No. 09/543,747, Paul D. Perry et al., filed Apr. 5, 2000.

U.S. patent Appln. No. 09/275,250, John E. Cook et al., filed Mar. 24, 1999.

U.S. patent Appln. No. 09/165,772, John E. Cook et al., filed Oct. 2, 1998.

U.S. Patent Application No. 09/843,175, "Vacuum Leak Verification System and Method," Craig Weldon, et al., filed Sep. 8, 2000 (Pending).

* cited by examiner

SENSOR ARRANGEMENT FOR AN INTEGRATED PRESSURE MANAGEMENT APPARATUS

FIELD OF THE INVENTION

This disclosure relates to a sensor arrangement for an Integrated Pressure Management Apparatus (IPMA) that manages pressure and detects leaks in a fuel system. This disclosure also relates to a sensor arrangement for an integrated pressure management system that performs a leak diagnostic for the headspace in a fuel tank, a canister that collects volatile fuel vapors from the headspace, a purge valve, and all associated hoses. And this disclosure also relates to controlled duty cycle purging that provides active leak detection recognition by the IPMA while the engine is operating and able to accept evaporative purging.

BACKGROUND OF THE INVENTION

In a conventional pressure management system for a vehicle, fuel vapor that escapes from a fuel tank is stored in a canister. If there is a leak in the fuel tank, canister or any other component of the vapor handling system, some fuel vapor could exit through the leak to escape into the atmosphere instead of being stored in the canister. Thus, it is desirable to detect leaks as a result of a 0.5 millimeter or greater break in the vapor handling system.

In such conventional pressure management systems, excess fuel vapor accumulates immediately after engine shutdown, thereby creating a positive pressure in the fuel vapor management system. Thus, it is desirable to vent, or "blow-off," through the canister, this excess fuel vapor and to facilitate vacuum generation in the fuel vapor management system. Similarly, it is desirable to relieve positive pressure during tank refueling by allowing air to exit the tank at high flow rates. This is commonly referred to as onboard refueling vapor recovery (ORVR).

SUMMARY OF THE INVENTION

The present invention provides a sensor arrangement for an integrated pressure management apparatus. The sensor arrangement comprises a chamber having an interior volume varying in response to fluid pressure in the chamber, a first switch, and a second switch. The chamber includes a diaphragm that is displaceable between a first configuration in response to fluid pressure above a first pressure level, a second configuration in response to fluid pressure below the first pressure level, and a third configuration in response to fluid pressure below a second pressure level. The third pressure level being lower than the second pressure level, and the second pressure level being lower than the first pressure level. The first switch is actuated by the diaphragm in the second configuration. And the second switch is actuated by the diaphragm in the third configuration.

The present invention also provides an integrated pressure management apparatus. The integrated pressure management apparatus comprises a housing defining an interior chamber, a pressure operable device, a first switch, and a second switch. The housing includes the first and second ports that communicate with the interior chamber. The pressure operable device separates the chamber into a first portion that communicates with the first port, a second portion that communicates with the second port, and a third portion that has an interior volume that varies in response to fluid pressure in the first portion. The pressure operable device is displaceable between a first configuration in response to fluid pressure in the third portion above a first pressure level, a second configuration in response to fluid pressure in the third portion below the first pressure level, and a third configuration in response to fluid pressure in the third portion below a second pressure level. The third pressure level is lower than the second pressure level, and the second pressure level is lower than the first pressure level. The first switch is actuated by the pressure operable device in the second configuration. And the second switch is actuated by the pressure operable device in the third configuration The present invention further provides a method of detecting detecting leaks in a fuel system for an internal combustion engine that has an engine control unit. The fuel system includes a purge valve and an integrated pressure management apparatus. The integrated pressure appratus has a first switch that is activated at a first pressure level below ambient pressure, a second switch that is activated at a second pressure level below ambient, and a pressure operable device relieving excess vacuum at a third pressure level below ambient. The third pressure level is lower than the second pressure level, and the second pressure level is lower than the first pressure level. The method comprises operating the purge valve according to a first controlled duty cycle purge during operation of the internal combustion engine, indicating a gross leak, operating the purge valve according to a second controlled duty cycle purge during operation of the internal combustion engine, indicating a sealed fuel system, indicating a small leak, and indicating a large leak. The operating the purge valve according to the first controlled duty cycle purge draws a first vacuum between the first and second pressure levels. The operating the purge valve according to the second controlled duty cycle purge draws a second vacuum between the first and second pressure levels. The second vacuum is greater than the first vacuum. A gross leak is indicated if the first switch is not activated. A sealed fuel system is indicated if the first and second switches are activated. A small leak is indicated if the second switch is not activated and the first switch remains activated. And a large leak is indicated if the second switch is not activated and the first switch is intially activated and is subsequently deactivated.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
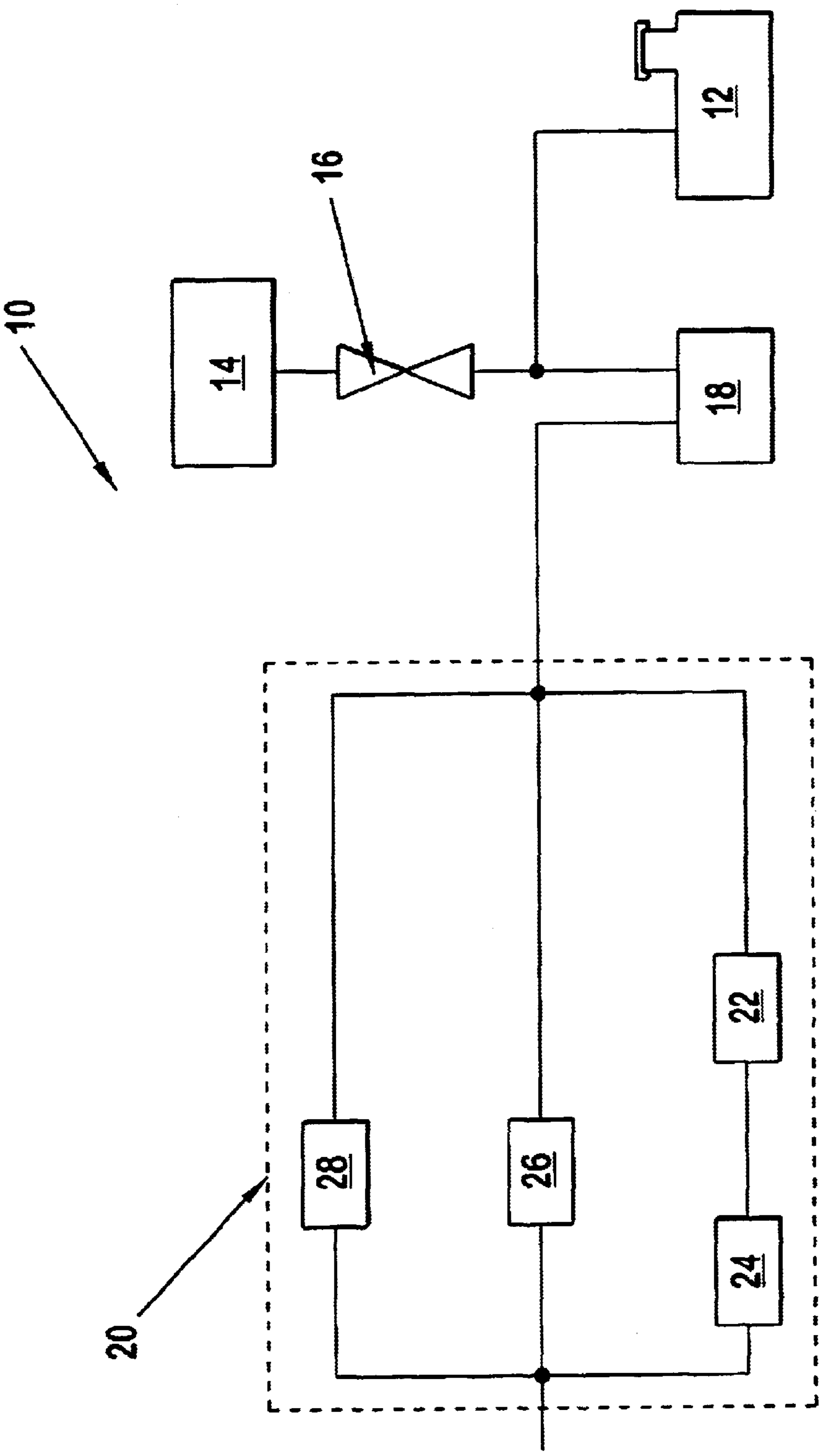
FIG. 1 is a schematic illustration showing the operation of an integrated pressure management system.

Referring to FIG. 1, a fuel system 10, e.g., for an engine (not shown), includes a fuel tank 12, a vacuum source 14 such as an intake manifold of the engine, a purge valve 16, a charcoal canister 18, and an integrated pressure management system (IPMA) 20.

The IPMA 20 performs a plurality of functions including signaling 22 that a first predetermined pressure (vacuum) level exists, relieving negative pressure 24 at a value below a third predetermined pressure level, relieving positive pressure 26 above a second pressure level, and controllably connecting 28 the charcoal canister 18 to the ambient atmospheric pressure A.

In the course of cooling that is experienced by the fuel system 10, e.g., after the engine is turned off, a vacuum is created in the tank 12 and charcoal canister 18 by virtue of the IPMA 20 isolating the fuel system 10. The existence of a vacuum at the first predetermined pressure level indicates that the integrity of the fuel system 10 is satisfactory. Thus, signaling 22 is used for indicating the integrity of the fuel system 10, i.e., that there are no leaks. Subsequently relieving pressure 24 at a pressure level below the second predetermined pressure level protects the integrity of the fuel tank 12, i.e., prevents it from collapsing due to vacuum in the fuel system 10. Relieving pressure 24 also prevents "dirty" air from being drawn through a fuel cap (not shown) into the tank 12.

Immediately after the engine is turned off, relieving pressure 26 allows excess pressure due to fuel vaporization to blow off, thereby facilitating the desired vacuum generation that occurs during cooling. During blow off, air within the fuel system 10 is released while fuel molecules are retained. Similarly, in the course of refueling the fuel tank 12, relieving pressure 26 allows air to exit the fuel tank 12 at high flow.

While the engine is turned on, controllably connecting 28 the canister 18 to the ambient air A allows confirmation of the purge flow and allows confirmation of the signaling 22 performance. While the engine is turned off, controllably connecting 28 allows a computer for the engine to monitor the vacuum generated during cooling.

Figure 2:
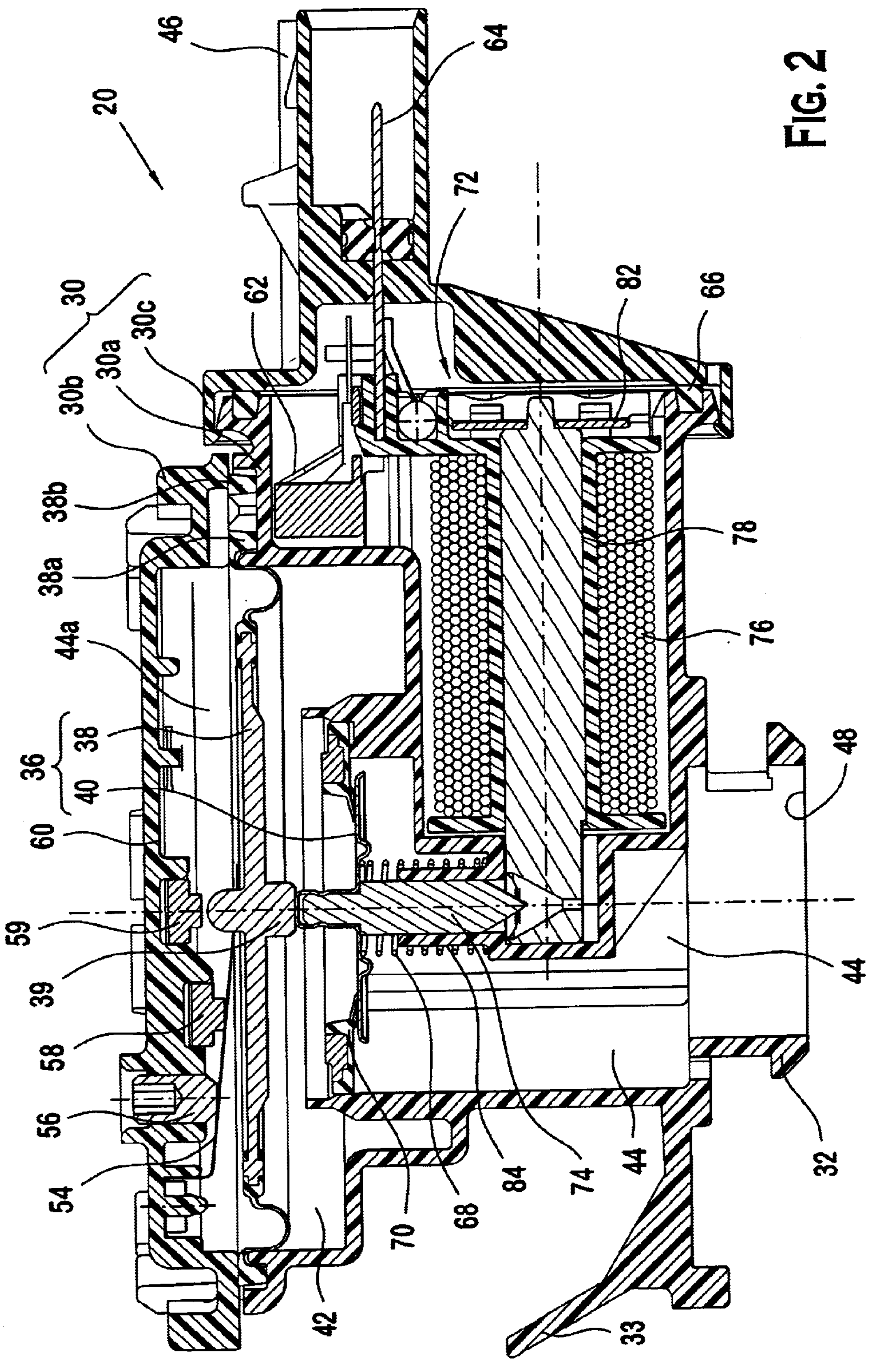
FIG. 2 is a cross-sectional view of an embodiment of an integrated pressure management system.

FIG. 2, shows a first embodiment of the IPMA 20 that can be directly mounted on the charcoal canister 18. The IPMA 20 includes a housing 30 that can be mounted to the body of the charcoal canister 18 by a "bayonet" style attachment 32. This attachment 32, in combination with a snap finger 33, allows the IPMA 20 to be readily serviced in the field. Of course, different styles of attachments between the IPMA 20 and the body 18 can be substituted for the illustrated bayonet attachment 32, e.g., a threaded attachment, an interlocking telescopic attachment, etc. Alternatively, the body 18 and the housing 30 can be integrally formed from a common homogenous material, can be permanently bonded together (e.g., using an adhesive), or the body 18 and the housing 30 can be interconnected via an intermediate member such as a pipe or a flexible hose.

The housing 30 can be an assembly of a main housing piece 30*a* and housing piece covers 30*b* and 30*c*. Although two housing piece covers 30*b*,30*c* have been illustrated, it is desirable to minimize the number of housing pieces to reduce the number of potential leak points, i.e., between housing pieces, which must be sealed. Minimizing the number of housing piece covers depends largely on the fluid flow path configuration through the main housing piece 30*a* and the manufacturing efficiency of incorporating the necessary components of the IPMA 20 via the ports of the flow path. Additional features of the housing 30 and the incorporation of components therein will be further described below.

Signaling 22 occurs when vacuum at the first and second predetermined pressure levels is present in the charcoal canister 18. A pressure operable device 36 separates an interior chamber in the housing 30. The pressure operable device 36, which includes a diaphragm 38 that is operatively interconnected to a valve 40, separates the interior chamber of the housing 30 into an upper portion 42 and a lower portion 44. The diaphragm 38 includes a bead 38*a* that provides a seal between the housing pieces 30*a*,30*b*. The upper portion 42 is in fluid communication with the ambient atmospheric pressure through a first port 46. The lower portion 44 is in fluid communication with a second port 48 between housing 30 the charcoal canister 18. The lower portion 44 is also in fluid communicating with a separate portion 44*a* via a signal passageway that extends through spaces between a solenoid 72 (as will be further described hereinafter) and the housing 30, through spaces between an intermediate lead frame 62 (as will be further described hereinafter) and the housing 30, and through a penetration in a protrusion 38*b* of the diaphragm 38. Orienting the opening of the signal passageway toward the charcoal canister 18 yields unexpected advantages in providing fluid communication between the portions 44,44*a*.

The force created as a result of vacuum in the separate portion 44*a* causes the diaphragm 38 to be displaced toward the housing part 30*b*. This displacement is opposed by a resilient element 54, e.g., a leaf spring. A calibrating screw 56 can adjust the bias of the resilient element 54 such that a desired level of vacuum, e.g., one inch of water, will depress a first switch 58 that can be mounted on a printed circuit board 60. In turn, the printed circuit board is electrically connected via an intermediate lead frame 62 to an outlet terminal 64 supported by the housing part 30*c*. The intermediate lead frame 62 penetrates the protrusion 38*b* of the diaphragm 38. An O-ring 66 seals the housing part 30*c* with respect to the housing part 30*a*. As vacuum is released, i.e., the pressure in the portions 44,44*a* rises, the resilient element 54 pushes the diaphragm 38 away from the first switch 58, whereby the first switch 58 resets.

If, rather than releasing the vacuum, a further vacuum is drawn, as will be further described hereinafter, a second switch 59 is activated, e.g., by contact with either the diaphragm 38 or the resilient element 54. Thus, activation of the second switch is indicative that the fuel system 10 has achieved an increased vacuum level, i.e., exceeding the calibration level for activating the first switch 58. The second switch 59 facilitates active on-board leak detection during engine operation, as will be described hereinafter.

Negative pressure relieving 24 occurs as vacuum in the portions 44,44*a* increases, i.e., the pressure decreases below the calibration level for actuating the switch 59. Vacuum in the charcoal canister 18 and the lower portion 44 will continually act on the valve 40 inasmuch as the upper portion 42 is always at or near the ambient atmospheric pressure A. At some value of vacuum, e.g., six inches of water, in excess of the levels for activating the switches 58,59, this vacuum will overcome the opposing force of a second resilient element 68 and displace the valve 40 away from a lip seal 70. This displacement will open the valve 40 from its closed configuration, thus allowing ambient air to be drawn through the upper portion 42 into the lower the portion 44. That is to say, in an open configuration of the valve 40, the first and second ports 46,48 are in fluid communication. In this way, vacuum in the fuel system 10 can be regulated so as to prevent a collapse in the fuel system 10.

Controllably connecting 28 to similarly displace the valve 40 from its closed configuration to its open configuration can be provided by a solenoid 72. At rest, the second resilient element 68 displaces the valve 40 to its closed configuration.

A ferrous armature 74, which can be fixed to the valve 40, can have a tapered tip that creates higher flux densities and therefore higher pull-in forces. A coil 76 surrounds a solid ferrous core 78 that is isolated from the charcoal canister 18 by an O-ring 80. A ferrous strap 82 that serves to focus the flux back towards the armature 74 completes the flux path. When the coil 76 is energized, the resultant flux pulls the valve 40 toward the core 78. The armature 74 can be prevented from touching the core 78 by a tube 84 that sits inside the second resilient element 68, thereby preventing magnetic lock-up. Since very little electrical power is required for the solenoid 72 to maintain the valve 40 in its open configuration, the power can be reduced to as little as 10% of the original power by pulse-width modulation. When electrical power is removed from the coil 76, the second resilient element 68 pushes the armature 74 and the valve 40 to the normally closed configuration of the valve 40.

Relieving positive pressure 26 is provided when there is a positive pressure in the lower portion 44, e.g., when the tank 12 is being refueled. Specifically, the valve 40 is displaced to its open configuration to provide a very low restriction path for escaping air from the tank 12. When the charcoal canister 18, and hence the lower portions 44, experience positive pressure above ambient atmospheric pressure, the signal passageway communicates this positive pressure to the separate portion 44*a*. In turn, this positive pressure displaces the diaphragm 38 downward toward the valve 40. A diaphragm pin 39 transfers the displacement of the diaphragm 38 to the valve 40, thereby displacing the valve 40 to its open configuration with respect to the lip seal 70. Thus, pressure in the charcoal canister 18 due to refueling is allowed to escape through the lower portion 44, past the lip seal 70, through the upper portion 42, and through the second port 46.

Relieving pressure 26 is also useful for regulating the pressure in fuel tank 12 during any situation in which the engine is turned off. By limiting the amount of positive pressure in the fuel tank 12, the cool-down vacuum effect will take place sooner and fuel tank explosion can be avoided.

By virtue of the second switch 59 and the controlled duty cycle purging, the IPMA 20 is also able to perform additional functions including leak detection recognition while the engine is operating and able to accept evaporative purging.

Figure 3:
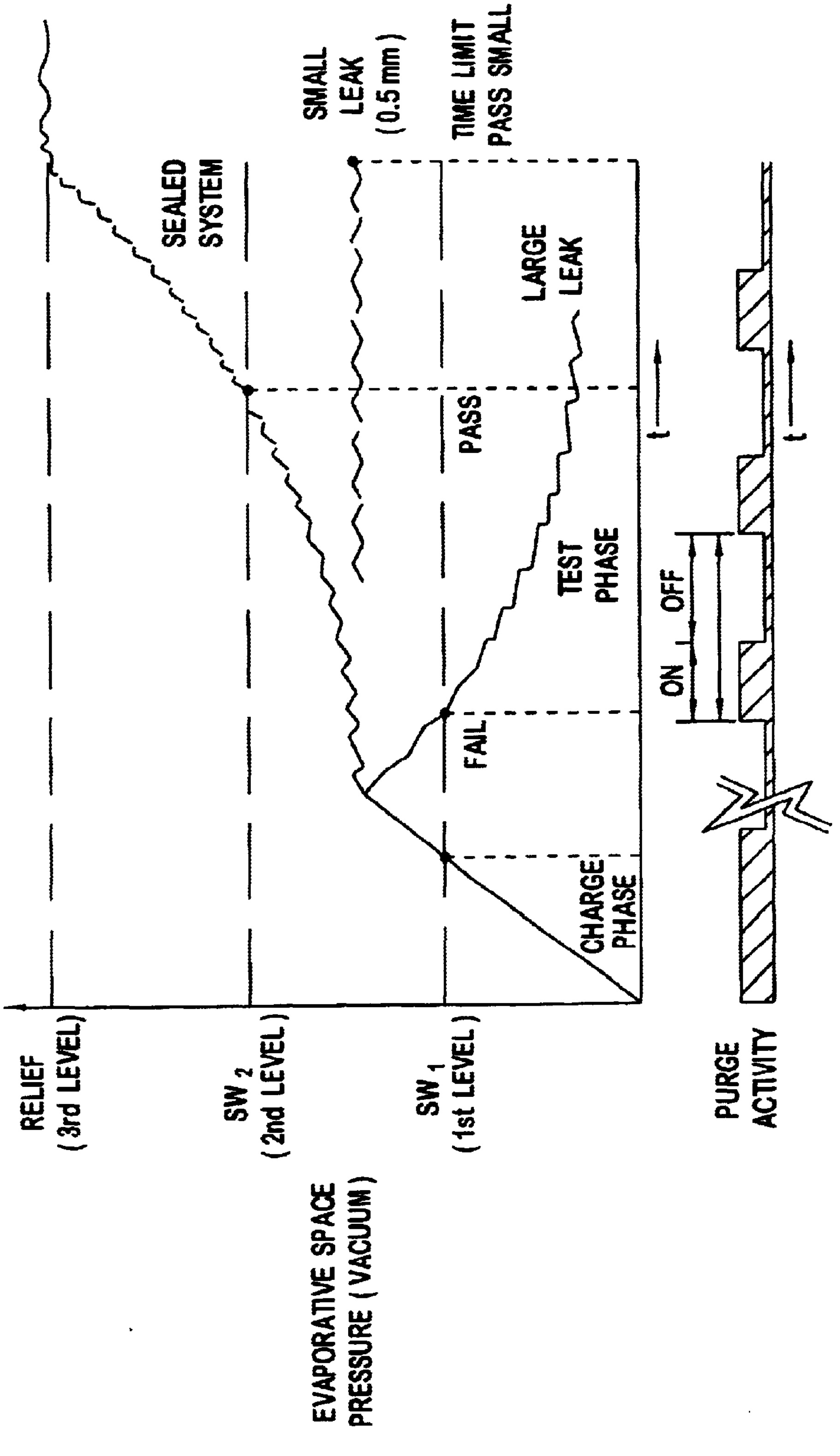
FIG. 3 is a graph illustrating the operation principles of the integrated pressure management system shown in FIG. 2.

Referring additionally to FIG. 3, the evaporative space in the fuel system 10 is initially charged, i.e., a vacuum is drawn according to a first controlled duty cycle purge by the purge valve 16, until the first switch 58 is activated, and then the fuel system 10 is allowed to stabilize. Upon successful stabilization, a second controlled duty cycle purge by the purge valve 16 is initiated to draw a further vacuum in the evaporative space. As discussed above, the IPMA 20 provides excess vacuum relief that prevents a implosion of the evaporative space.

The second switch 59 being activated indicates a sealed system. A "small" threshold leak is indicated if, after a set time period of the controlled duty cycle purge by the purge valve 16, the first switch 58 remains activated but the second switch 59 is not activated. A "large" leak is indicated if activation of the first switch 58 cannot be maintained.

However, certain operating conditions could cause false indications. For example, operating conditions of an IPMA equipped vehicle that result in decreasing engine load and increasing engine speed, e.g., when the vehicle is being driven down an incline, can cause a false indication that the fuel system 10 is sealed. Conversly, operating conditions that result in increasing engine load and decreasing engine speed, e.g., when the vehicle is being driven up an incline, can cause a false indication that there is a leak in the fuel system 10. These types of false indications can be identified by an Engine Control Unit (ECU) based on the engine load/speed maps that are stored in the ECU. A false indication that there is a leak can also result from excessive fuel vapors that are generated by a hot fuel cell. This type of false indication can be identified by the ECU based on a "lambda" sensor detecting an $O_2$ shift as a result of controlled duy cycle purging.

Thus, active leak detection can be performed while the engine is operating using an IPMA 20 comprising a second pressure switch 58 and using duty cycle controlled purging by the purge valve 16.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A sensor arrangement for an integrated pressure management apparatus, the sensor arrangement comprising:

a chamber having an interior volume varying in response to fluid pressure in the chamber, the chamber including a diaphragm displaceable between first configuration in response to fluid pressure above a first pressure level, a second configuration in response to fluid pressure at a second pressure level being lower than the first pressure level, and a third configuration in response to fluid pressure at a third pressure level being lower than the second pressure level, the diaphragm being displaced toward the first configuration in response to fluid pressure being lower than the third pressure level;

a first switch being actuated by the diaphragm in the second configuration; and a second switch being actuated by the diaphragm in the third configuration.

2. The sensor arrangement according to claim 1, wherein the first switch signals displacement of the diaphragm in response to negative pressure below the first pressure level in the chamber, and the second switch signals displacement of the diaphragm in response to negative pressure below the second pressure level in the chamber.

3. The sensor arrangement according to claim 1, wherein the first and second switches are disposed on the chamber.

4. The sensor arrangement according to claim 1, wherein the first and second switches are disposed within the chamber.

5. The sensor arrangement according to claim 1, further comprising:

a plurality of electrical connections fixed with respect to the chamber and electrically interconnected with the first and second switches.

6. The sensor arrangement according to claim 1, further comprising:

a resilient element biasing the diaphragm toward the first configuration.

7. The sensor arrangement according to claim 6, further comprising:

an adjuster calibrating a biasing force of the resilient element.

8. The sensor arrangement according to claim 7, wherein the calibrated biasing force of the resilient element corresponds to the first pressure level.

9. The sensor arrangement according to claim 6, wherein the resilient element includes a leaf spring.

10. The sensor arrangement according to claim 9, wherein the leaf spring includes a fixed end mounted with respect to the chamber and a free end engaging the diaphragm.

11. The sensor arrangement according to claim 10, further comprising:

an adjuster calibrating a biasing force of the resilient element, the adjuster contiguously engaging the leaf spring between the fixed and free ends.

12. The sensor arrangement according to claim 1, further comprising:

a printed circuit board in electrical communication with the switch, the printed circuit board being disposed within the chamber.

* * * * *